Figure 1:
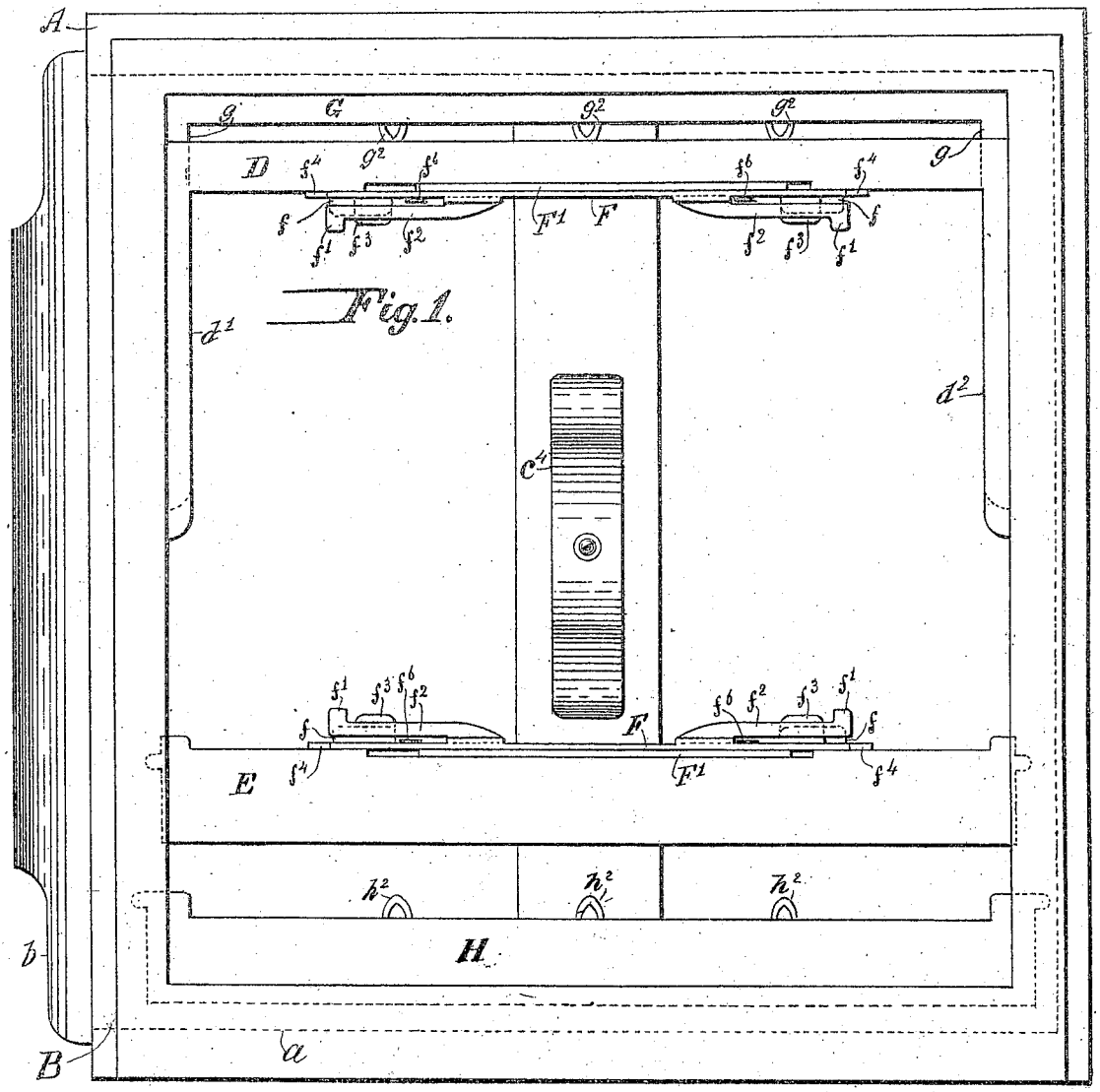

(No Model.)

2 Sheets—Sheet 1.

M. FLAMMANG.
PLATE HOLDER.

No. 530,100.

Patented Dec. 4, 1894.

WITNESSES:
Wm. A. Pollock
Jas. A. Cullen

INVENTOR
Mathias Flammang
BY Edwin H. Brown
HIS ATTORNEY (No Model.) 2 Sheets—Sheet 2.
M. FLAMMANG.
PLATE HOLDER.
No. 530,100. Patented Dec. 4, 1894.
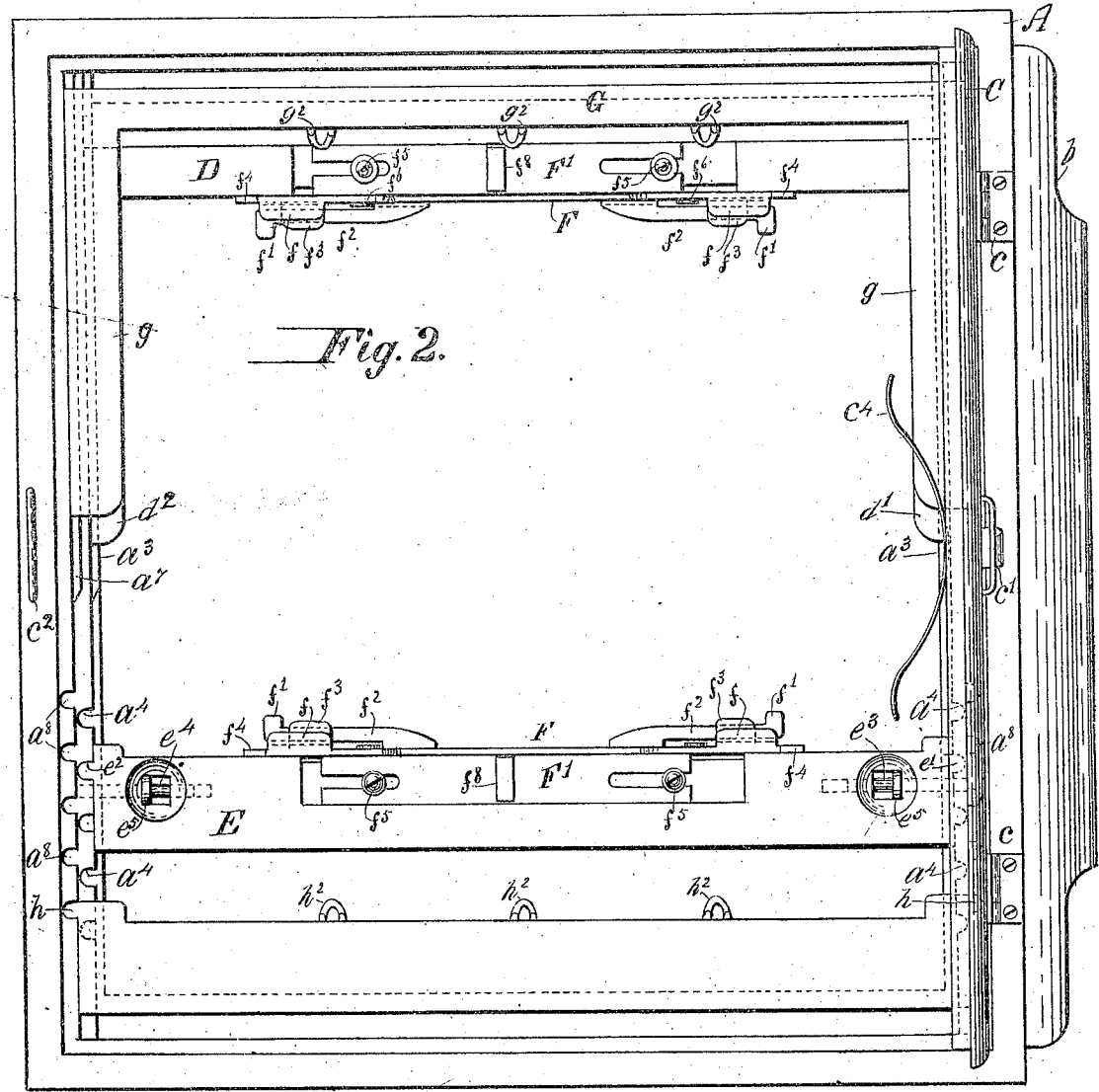
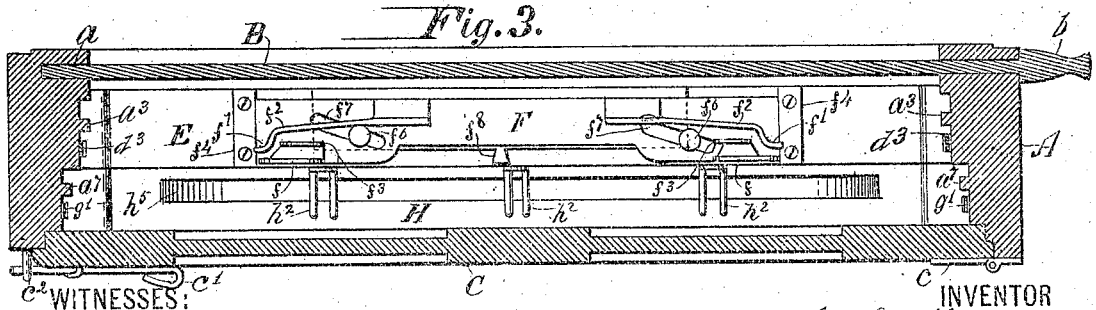
WITNESSES:
Wm. A. Pollock
Jas. J. Cullen
INVENTOR
Mathias Flammang
BY Edwin H. Brown
HIS ATTORNEY

UNITED STATES PATENT OFFICE.

MATHIAS FLAMMANG, OF NEWARK, NEW JERSEY, ASSIGNOR TO THE SCOVILL & ADAMS COMPANY, OF CONNECTICUT.

PLATE-HOLDER.

SPECIFICATION forming part of Letters Patent No. 530,100, dated December 4, 1894.

Application filed February 21, 1894. Serial No. 500,943. (No model.)

*To all whom it may concern:*

Be it known that I, MATHIAS FLAMMANG, of Newark, Essex county, State of New Jersey, have invented a certain new and useful Improvement in Plate-Holders, of which the following is a specification.

The object of my improvement is to provide a plate holder of simple construction which may be employed for ordinary printing, or printing with what is known as a ray negative, which in other words, is a transparent plate having etched or engraved lines.

I will describe a plate holder embodying my improvement and then point out the novel features in the claims.

In the accompanying drawings, Figure 1 is a front view of a plate holder embodying my improvement, the dark slide or front cover being shown in a closed position, but with the main portion of the cover removed for the sake of showing the parts rearward of the cover. Fig. 2 is a rear view with the back cover open. Fig. 3 is a horizontal section through the plate holder, showing a portion of the frame thereof in cross-section, and the lower supports for the plates in plan view.

Similar letters of reference designate corresponding parts in all the figures.

A designates the frame of the plate holder. It is of rectangular form and will preferably be made of wood as usual. At the front it is provided with a slide way $a$ in which works a dark slide or shutter B forming a front cover. This is shown as consisting of a thin flat piece of board or similar material working through an opening in one side of the frame A, and having a handle $b$ which serves as a means of adjustment and also closes the opening in the side of the frame A when the dark slide or cover is closed.

At the rear of the frame A is a back cover C which is connected at one side edge by means of hinges $c$ with one side of the frame A and at the other side edge is provided with a catch $c'$ which is adapted to engage with a hasp $c^2$ affixed to the corresponding side of the frame A. Preferably, the forward side of this back cover C will be rabbeted so as to make a tight joint when closed.

D designates a slide bar fitted within the frame A to slide transversely to the direction of movement of the dark slide or shutter B. As here shown, it has two slide pieces $d'$, $d^2$ which are grooved at their outer ends to engage with ribs $a^3$ formed on the sides of the frame A. Preferably the slide pieces $d'$, $d^2$ will be provided with springs $d^3$ consisting of strips of metal fastened at one end by screws to the slide pieces and impinging against the sides of the frame A to produce sufficient friction to hold the slide bar D in position. Opposite the slide bar D is a bar E. This is adjustable toward and from the slide bar D, its adjustability being afforded by constructing it so that it may be engaged with the sides of the frame A in different positions. As shown it is provided on its ends with ribs $e'$, $e^2$ which engage with grooves $a^4$ formed in the sides of the frame A; there being a number of these grooves $a^4$ to allow of the bar E being taken out and changed in position.

Preferably the bar E will be provided with bolts $e^3$, $e^4$, fitted in the end portions of the bar E so as to be capable of moving lengthwise of the latter. These bolts are provided with transverse lugs $e^5$ which extend through holes in the front of the bar to afford a means for adjusting the bolts. By manipulating these bolts, they may be engaged with or disengaged from holes in the sides of the frame A. Thus the bar E may be very securely fastened in place. The opposite sides of the bars D and E are fitted with means for holding a ray negative which ordinarily is made of a plate of glass ruled or etched with lines to simulate in the process of printing a photograph, the lines of an engraving.

The means for holding the ray negative may be precisely similar upon both of the bars D and E and they are proposed to be thus made in the construction illustrated in the drawings, wherefore it has only been thought necessary to show in plan, these devices as arranged upon one of the bars.

I will now describe the means for holding the ray negative.

F designates a plate having ledges $f$ against which a ray negative may rest and adjustable fingers or clamps $f'$ for holding the ray negative against the ledges. It will of course, be understood that the rests and clamps $f$, $f'$ of each of the bars D, E, extend toward the opposite bar. The clamps $f'$ are shown as fastened to spring strips $f^2$, which in turn are fastened to the plate F. I have also shown on the plate F other ledges $f^3$ which are opposite the ledges $f$. The ledges $f^3$ are made shorter in the direction of the length of the plate F than are the ledges $f$; this feature of construction being adopted for the purpose of allowing the clamps $f'$ to be arranged opposite to portions of the ledges $f$.

It is obvious that a ray negative plate may be inserted between the ledges $f$ and the clamps $f'$ and that the latter will firmly hold it in place.

The plate F is not immovably secured to its support bar D or E, but is fitted to slide transversely to each bar. In the present instance, it is fitted between bars $f^4$ which may be fastened by screws or otherwise to the bar and together constitute a slideway.

Between the plate F and its supporting bar D or E, I arrange an adjusting device F', here shown as consisting of a plate fitted to slide lengthwise of the supporting bar and capable of imparting transverse motion to the plate F. As shown, the plate F' is bent transversely between its longitudinal edges so as to have portions which bear against two adjacent surfaces of the supporting bar. A recess may advantageously be formed in the supporting bar to accommodate the plate F'. As here shown, one portion of the plate F' is longitudinally slotted or notched to engage with screws $f^5$ which secure it in place and guide it. The other portion of the plate F' is provided with pins $f^6$ which work in oblique slides $f^7$ formed in the plate F. These pins $f^6$ may have heads for the purpose of holding the plate F adjacent to its supporting bar. The plate F' may have any adjustable hand piece, as for instance, a projection $f^8$.

It is obvious that after a ray negative has been placed between the holding devices, consisting of the ledges $f$ and the clamps $f'$ belonging to the two bars D, E, such negative may be moved toward or from the front of the plate holder by adjusting the plates F' of the two bars D, E, and that this may be done with great nicety and facility.

G designates a slide bar provided at its ends with slide pieces $g$ which are grooved to fit ribs $a^7$ in the sides of the frame A. Preferably these slide pieces will be provided with springs $g'$ which are fastened at one end by screws to the slide pieces and which bear against the sides of the frame A to produce friction enough to preclude accidental adjustment of the bar. This slide bar is rearward of the slide bar D.

Opposite the slide bar G is a bar H which is provided at the ends with ribs $h$ for engaging with grooves $a^8$ formed in the sides of the frame A. By removing the bar H and re-engaging it with other grooves, it may be adjusted and still held firmly in position.

The bars G, H are shown as provided with blocks for supporting a photographic negative. Preferably these blocks consist of staples of silver $g^2$, $h^2$ inserted at their ends in the bars G, H, and then bent toward the front of the plate holder and then parallel with the front of the plate holder.

The bar H may be provided with a trough $h^5$ in the usual manner, to catch drippings.

The cover C is provided with a spring $c^4$ for bearing against the back of the photographic negative to hold it against the said blocks.

What I claim as my invention, and desire to secure by Letters Patent, is—

1. In a plate holder, the combination of a frame, a dark slide or shutter for the front thereof, two sets of adjustable bars, one set being arranged rearward of the other, sliding plates supported upon one set of said adjustable bars, means carried by said sliding plates for holding a ray negative, and mechanism for causing said plates to move to and from the front of the plate holder, substantially as specified.

2. In a plate holder, the combination of two sets of adjustable bars, plates supported upon one set of adjustable bars and movable toward and away from the other set of adjustable bars means consisting of adjustable fingers or cramps and corresponding ledges, carried by said plates for supporting a ray negative, bars or plates carrying studs or pins which work in slots arranged in the first mentioned plates to move the same toward and away from one set of adjustable bars, substantially as specified.

In testimony whereof I have signed my name to this specification in the presence of two subscribing witnesses.

MATHIAS FLAMMANG.

Witnesses:
CHAS. T. LUNT,
H. LITTLEJOHN.